United States Patent [19]

Munnichs et al.

[11] 4,353,870

[45] Oct. 12, 1982

[54] INSTALLATION FOR PROTECTING OF REACTORS

[75] Inventors: Cornelis M. Munnichs, Born; Theodorus F. I. Bookelmann, Geleen, both of Netherlands

[73] Assignee: Stamicarbon, B.V., Geleen, Netherlands

[21] Appl. No.: 261,798

[22] Filed: May 8, 1981

Related U.S. Application Data

[63] Continuation of Ser. No. 968,795, Dec. 12, 1978, abandoned, which is a continuation of Ser. No. 801,244, May 27, 1977, abandoned.

[30] Foreign Application Priority Data

May 29, 1976 [NL] Netherlands ............... 7605817

[51] Int. Cl.$^3$ .................................................. B01F 3/04
[52] U.S. Cl. ...................................... 422/129; 55/244; 261/114 A; 261/123; 261/151; 261/DIG. 11; 422/310
[58] Field of Search ............... 55/220, 244, 245, 355; 422/120, 129, 310, 203, 207; 261/114 A, 151, 123, 126, DIG. 11, DIG. 9; 98/30, 115 R, 115 LH, 115 SB; 48/192, 193; 23/293 R; 526/71

[56] References Cited

U.S. PATENT DOCUMENTS

| | | | |
|---|---|---|---|
| 2,480,862 | 9/1949 | Johnson | 261/114 A |
| 2,907,263 | 10/1959 | Muller | 98/115 R |
| 3,121,618 | 2/1964 | Yerzley | 98/115 LH X |
| 3,462,919 | 8/1969 | Zalman | 98/115 R X |
| 3,766,716 | 10/1973 | Ruiz | 261/126 X |
| 3,781,256 | 12/1973 | Sadee et al. | 526/71 |
| 3,888,955 | 6/1975 | Maruko | 261/DIG. 9 |
| 3,927,153 | 12/1975 | Tarhan | 261/DIG. 9 |
| 4,013,455 | 3/1977 | Kleeberg et al. | 261/DIG. 9 |
| 4,054,623 | 10/1977 | Ouska | 261/DIG. 11 |

Primary Examiner—Richard L. Chiesa

[57] ABSTRACT

Protection of reactors, installed in an enclosed space, in which reactions take place with gases or volatile substances that are toxic and/or that can form an explosive mixture with air. The enclosed space is in open connection with means for passing any gases that may have escaped from the reactor through a liquid bath. The height of the liquid layer and the contents of the liquid bath are sufficient for the maximum possible amount of gas or volatile substance issued from the reactor to be dissolved, condensed, cooled off, inertized or be allowed to react. The liquid in the bath is water, lye, a salt solution, a cooled salt solution or heavy oil.

8 Claims, 1 Drawing Figure

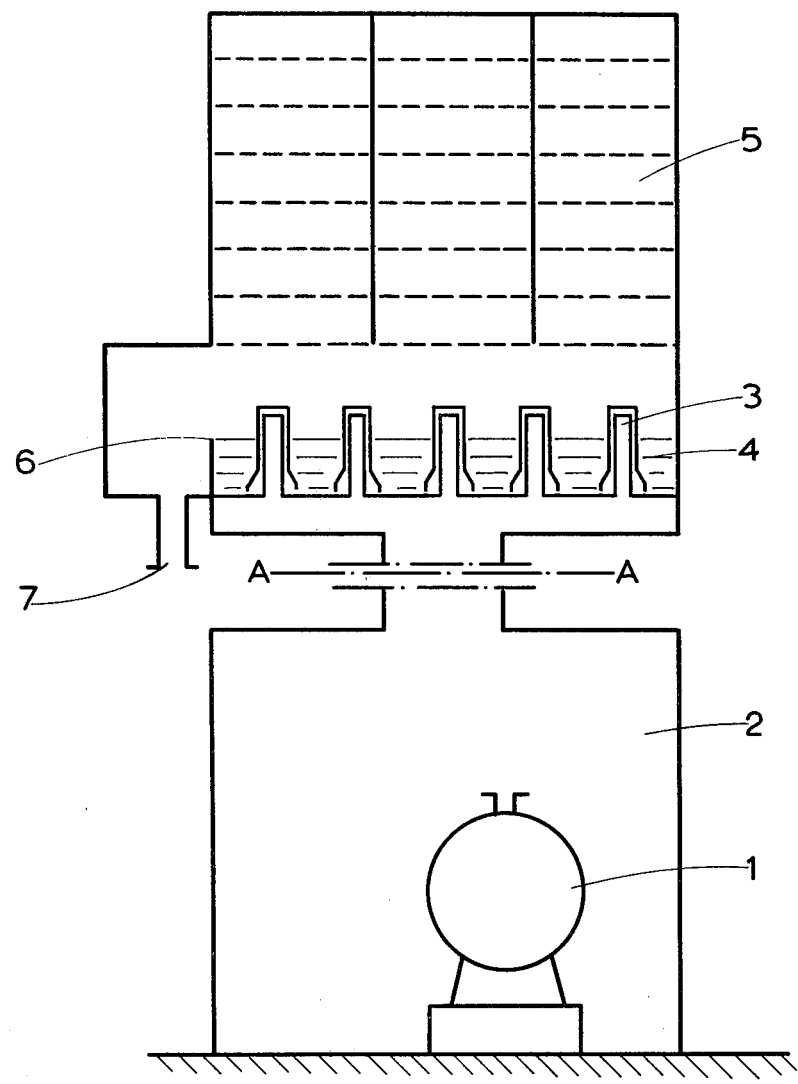

INSTALLATION FOR PROTECTING OF REACTORS

This is a continuation of application Ser. No. 968,795, filed Dec. 12, 1978, now abandoned, which is a continuation of application Ser. No. 801,244, filed May 27, 1977, now abandoned.

The invention relates to an installation for protection of reactors which are installed in an enclosed space and in which reactions take place of gases or volatile substances that are toxic and/or that can form an explosive mixture with air.

Protection of reactors from which gases may escape that form an explosive mixture with air is known, amongst others, from the Dutch Patent Applications Nos. 7,017,347 and 7,110,020. Both applications relate to the preparation of polymers of ethylene in a high-pressure reactor. When a certain pressure in the reactor is exceeded as a result of disintegration of ethylene, a safety device starts to operate and the hot gases, particularly hydrogen and methane, are discharged. Owing to the high temperature of the gases themselves a gas mixture will be formed with air, which mixture may explode spontaneously. In order to avoid this, such an amount of water is sprayed in the gas, and, hence, the gases are so cooled—immediately after the safety device has started to operate—that no ignition takes place upon issue into the air.

For safe operation it should be taken into account that, for whatever reason, a relatively large amount of reactant may suddenly escape out of a reactor in any, arbitrary place.

The object of the invention is to provide an installation which makes it possible for toxic or flammable gases that may suddenly be liberated from a reactor installed in an enclosed space to be quickly rendered harmless and to guarantee safe process control.

According to the invention this is achieved if the enclosed space is in open connection with means for passing any gases that may have escaped from the reactor through a liquid bath, in which the height of the liquid layer and the contents of the liquid bath are sufficient for the maximum possible amount of gas or volatile substance issued from the reactor to be dissolved, condensed, cooled off, inertized or be allowed to react, and in which the enclosed space can stand an internal overpressure which is equal to at least the dynamic and static pressure to which the gas is subjected by the liquid bath.

In general, it will be possible to apply water as liquid because many gases dissolve, condense or react in water or aqueous solutions, seeing that water has a very large heat of evaporation and specific heat. However, if one is to deal with toxic gases, a liquid will, preferably, be chosen for each gas with which the gas reacts.

Below, a number of examples are given:

| Gas | Liquid | Mode of absorption |
| --- | --- | --- |
| acetone | water | dissolution/condensation |
| acrylonitrile | water | dissolution/condensation |
| ammonia | water | dissolution/condensation |
| anone | water | dissolution/condensation |
| anol | water | dissolution/condensation |
| cyclohexane | water | condensation |
| methyl-ethyl-ketone | water | dissolution/condensation |
| ethylene oxide | water | dissolution |
| toluene | water | condensation |
| benzene | water | condensation |
| sulphur trioxide | water | dissolution/condensation |
| chlorine | (soda) lye | reaction |
| bromine | (soda) lye | reaction |
| hydrogen sulphide | (soda) lye | reaction |
| carbon monoxide | (soda) lye | reaction |
| phosgene | (soda) lye | reaction |
| hydrocyanic acid | (soda) lye | reaction |
| butane | salt-solution | condensation |
| pentane | (cooled) | |
| butane | heavy oils | dissolution |
| hexane | heavy oils | dissolution |
| propane | heavy oils | dissolution |
| benzene | heavy oils | dissolution/condensation |
| toluene | heavy oils | dissolution/condensation |

The location of the liquid bath depends on the operating conditions and may be provided both on the roof of the enclosed space and beside this enclosed space. Gas escaped from the reactor is, the most efficiently, allowed to enter the liquid via so-called bubble caps, which are installed in the bottom of the liquid bath. The liquid in the liquid bath may form part of a cooling system, particular if water is applied.

In principle, application of a solid, e.g. active carbon, instead of a liquid is also possible and is considered to be covered by the essence of the invention. By preference, however, such a solid will not be applied because there may be a risk of e.g. active carbon becoming saturated unnoticed.

The invention will be elucidated in more detail on the basis of a drawing, where:

1. is the reactor,
2. the enclosed space,
3. the bubble caps,
4. the liquid bath,
5. the cooling system,
6. the liquid overflow,
7. the liquid discharge.

A—A, the line by which is indicated that the liquid bath 4 and the cooling system 5 may be separate. The liquid bath 4 may be installed both over and beside the space 2. This depends on local conditions. The drawing is further self-explanatory.

EXAMPLE

For a reactor containing 20 m³ of acetone a water bath sized 7 m by 9 m, having a water height of 1 m (amount of water 63 m³), was installed over a building in which the reactor is installed. Escaped gas can be passed through the liquid with 20 bubble caps. The building has been designed to stand an overpressure of 0.2 atm.

We claim:
1. Apparatus for the protection of the atmosphere from a sudden inadvertent escape of harmful gases from a chemical reactor, said apparatus comprising the combination of reactor enclosing means, liquid containing means and connecting means between said reactor enclosing means and said liquid containing means wherein:
   said reactor enclosing means define an enclosed space surrounding said reactor, and are adapted to contain said escaping gases, and to withstand the static and dynamic pressure required for the introduction and flow of said gases into said liquid containing means;

said liquid containing means are adapted to contain a liquid in sufficient depth and volume to take up by absorption, dissolution, condensation or reaction all such gases which may inadvertently escape from said chemical reactor, and to provide for the introduction of said gases into said liquid containing means near the bottom thereof; and said connecting means provide open communication between said enclosed space and said liquid containing means, and are adapted to guide the flow of said gases into said liquid containing means near the bottom thereof.

2. The apparatus of claim 1 additionally including cooling means adapted to cool a liquid wherein said liquid containing means forms a portion of said cooling means.

3. The apparatus of claim 2 wherein the cooling means is a cooling tower having a liquid collecting portion at the base thereof, and wherein said liquid containing means is said liquid collecting portion of said tower.

4. The apparatus of claim 1 wherein said liquid containing means is positioned above said reactor enclosing means.

5. The apparatus of claim 1 wherein said liquid containing means is positioned in horizontal relation to said reactor enclosing means.

6. The apparatus of claim 1 additionally including a selected liquid present in said liquid containing means in sufficient depth and volume to take up by absorption, dissolution, condensation or reaction all such gases which may inadvertently escape from said chemical reactor, and wherein said liquid containing means are adapted to provide intimate contact between said gases and said liquid.

7. The apparatus of claim 6 wherein said liquid is selected from the group consisting of water, an aqueous lye solution, a cooled salt solution, and a heavy oil.

8. The apparatus of claim 6 wherein bubble caps are located within said liquid containing means in such manner that said gas is passed through said bubble caps upon entering said liquid containing means and comes into intimate contact with said liquid.

* * * * *